(12) United States Patent
Matye

(10) Patent No.: US 6,293,051 B1
(45) Date of Patent: Sep. 25, 2001

(54) AUTOMATED HATCH

(75) Inventor: Reinhard Matye, Charlevoix, MI (US)

(73) Assignee: DCL, Inc., Charlevoix, MI (US)

( * ) Notice: Subject to any disclaimer, the term of this patent is extended or adjusted under 35 U.S.C. 154(b) by 0 days.

(21) Appl. No.: 09/507,619

(22) Filed: Feb. 21, 2000

(51) Int. Cl.$^7$ ....................................... E05C 9/00
(52) U.S. Cl. ............................................... 49/395
(58) Field of Search ........................... 49/25, 394, 395, 49/279, 280; 292/5, 6, 7

(56) References Cited

U.S. PATENT DOCUMENTS

| | | |
|---|---|---|
| 1,197,560 | 9/1916 | Smith . |
| 3,272,552 | 9/1966 | Park ........................ 296/56 |
| 3,385,655 | 5/1968 | Huston et al. ............... 21/91 |
| 3,387,738 | 6/1968 | Kemp ........................ 220/46 |
| 3,476,042 | 11/1969 | Carney, Jr. et al. .......... 105/377 |
| 3,696,774 | 10/1972 | Ostrem ...................... 114/203 |
| 3,821,935 | * 7/1974 | Adler ....................... 105/377 |
| 4,294,378 | * 10/1981 | Rabinovich .................. 220/323 |
| 4,388,873 | 6/1983 | Carleton et al. ............. 105/377 |
| 4,570,816 | * 2/1986 | Ferris et al. ............... 220/314 |
| 4,854,076 | 8/1989 | Sieben et al. ............... 49/280 |
| 4,891,910 | 1/1990 | Cook et al. ................. 49/395 |
| 4,944,233 | 7/1990 | Dugge et al. ................ 105/377 |
| 4,948,185 | * 8/1990 | Miller ...................... 292/256.5 |
| 5,105,714 | * 4/1992 | Sprafke et al. .............. 49/67 X |
| 5,283,979 | 2/1994 | Carlson et al. .............. 49/395 |
| 5,700,043 | 12/1997 | Rohard et al. ............... 292/256.6 |
| 5,937,581 | 8/1999 | Matye et al. ................ 49/279 |

FOREIGN PATENT DOCUMENTS

| | | |
|---|---|---|
| 33658 | 11/1885 | (DE) . |
| 123986 | 2/1928 | (DE) . |
| 2317289 | 12/1973 | (DE) . |
| 267973 | 1/1928 | (GB) . |
| 781140 | 8/1957 | (GB) . |
| 1210749 | 10/1970 | (GB) . |
| 461893 | 1/1951 | (IT) . |
| 642980 | 7/1962 | (IT) . |
| 258881 | 11/1987 | (JP) . |
| 3-72186 | 3/1991 | (JP) . |
| 387875 | 10/1973 | (SU) . |

* cited by examiner

Primary Examiner—Jerry Redman
(74) Attorney, Agent, or Firm—Van Dyke, Gardner, Linn & Burkhart, LLP

(57) ABSTRACT

An automated hatch for a bulk transport vehicle includes a cover and a locking assembly. The vehicle includes a container and at least one upstanding annular flange defining a fill opening for the container. The cover is adapted to pivotally mount on the vehicle, with the cover moving between an open position and a closed position for extending over the annular flange and closing the fill opening. The locking assembly includes a driver assembly and a plurality of locking members. The driver assembly includes a plurality of pusher members, with each of the pusher members being pivotally mounted to a respective locking member. The locking members are mounted to the peripheral portion of the cover for engaging the annular flange of the vehicle for locking the cover in the closed position. The driver assembly further includes a driving member which rotates about a drive axis, with each of the pusher members being pivotally mounted to the driving member and being moved by the driving member between a retracted position and an extended position. The pusher members pivot the locking members to their unlocked positions when the pusher members are moved to their retracted positions and pivot the locking member to their locked positions when the pusher members are moved to their extended positions thereby locking the cover in its closed position over the fill opening.

34 Claims, 3 Drawing Sheets

AUTOMATED HATCH

TECHNICAL FIELD AND BACKGROUND OF THE INVENTION

The present invention relates to a hatch cover for a bulk transport vehicle, such as a trailer truck, and, more particularly to a hatch cover that can be unlocked, opened, closed, or locked by one or more remote controls which are easily accessible by an operator or the driver of the vehicle.

Trucks used for transporting dry bulk goods, such as ash, cement, lime, plastic resin fertilizers, chemicals and the like typically include one or more storage containers, The bulk goods are loaded into a respective container through a fill opening which is provided on the top of the container and is covered and sealed by a hatch cover. The cover is typically pivotally mounted to the container and secured in a closed position over the fill opening by a plurality of hold-down clamps. The hold-down clamps are pivotally mounted to the container around the fill opening and engage a corresponding plurality of tabs or ears which are provided on the cover. In order to unlock the hatch cover, each hold-down clamp must be individually loosened and then disengaged from the tab; thereafter, the hatch cover can be opened. In a like manner, in order to close and lock the hatch cover, the cover must be pivoted to its closed position and then each hold-down clamp must be repositioned to engage a respective tab and tightened down to assure an effective seal between the cover and the container. Most hatch covers include four or more hold-down clamps; thus, it can be appreciated that the process of unlocking, opening, closing, and locking a conventional hatch cover is time consuming.

In addition to being time consuming, the driver or operator is exposed to potential injuries. In order to open the cover, the driver must exit the cab of the truck and scale the side of the truck to reach the hatch cover where the driver manually unlocks each hold-down clamp. Once unlocked, the driver lifts the hatch cover so that the container can be filled. After filling, the driver typically rescales the side of the truck to close and then lock the hatch cover. Since these storage containers are generally rounded, this process can expose the driver to the risk of siding or falling off the vehicle. Recently, this danger of falling from or sliding off the truck has prompted governing agencies to promulgate regulations that require both producers and delivery site owners to provide safety cages or platforms which support the driver while he or she opens and closes the hatch cover to reduce the risk of injury to the driver. However, these safety cages and platforms are expensive to install and maintain.

Consequently, there is a need for an automated hatch that will eliminate the associated risks with the conventional manual method of unlocking, opening, closing, and locking hatches and, further, will save time.

SUMMARY OF THE INVENTION

Accordingly, the present invention provides a new and unique automated hatch which is especially suited for use on a bulk transport vehicle, The automated hatch includes a locking device which permits remote unlocking and locking of the hatch cover so that bulk material can be loaded into the vehicle through the fill opening quickly and without the risks associated with manual locking and unlocking of the hatch cover.

In one form of the invention, an automated hatch includes a cover and a locking assembly. The cover is adapted for pivotally mounting to a vehicle over a fill opening for covering and sealing the fill opening. The locking assembly is supported on the cover and includes at least one pivotal locking member, a pusher member, and a driver. The locking member is pivotally mounted to the cover and pivots between an unlocked position and a locked position for engaging an engagement surface adjacent the fill opening to thereby lock the cover over the fill opening. The pusher member is coupled to the driver and the locking member. The driver is remotely actuatable and moves the pusher arm outwardly to pivot the locking member to its locked position and moves the pusher arm radially inward to pivot the locking member to its unlocked position.

In one aspect, the driver includes a motor and a rotatable member. The pusher member is pivotally coupled to the rotatable member, such that rotation of the rotatable member by the motor about an axis of rotation moves the pusher member either inwardly or outwardly to pivot the locking member. In preferred form, the axis of rotation is substantially orthogonal to the pivot axis of the locking member, In other aspects, the pusher member comprises an articulating pusher arm. For example, the arm may include a first portion which is pivotally coupled to the driver and a second portion which is pivotally coupled to the first portion on one end and pivotally coupled to the locking member on a second end.

In another form of the invention, an automated hatch for a bulk transport vehicle having a container with at least one fill opening and an engagement surface adjacent the fill opening, The automated hatch includes a cover for extending over the fill opening for closing the fill opening, a driver, a plurality of pusher members, and a corresponding plurality of locking members. The pusher members extend laterally and outwardly from the driver in a common plane. Each of the pusher members is coupled to a respective locking member. The locking members are mounted to the cover for pivotal movement between an unlocked position and a locked position wherein the locking members are adapted to engage the engagement surface. The driver moves the pusher members in an outward direction in the common plane to pivot the locking members to their locked positioned and moves the pusher arms inwardly to pivot the locking members to their unlocked positions.

In one form, the driver includes a motor and a rotatable driving member, with the motor rotating the driving member about an axis of rotation. The pusher members extend outwardly from the axis of rotation for pivoting the locking members between their locked and unlocked positions.

In further forms, each of the pusher members is pivotally mounted to the driving member, the motor rotates the driving member about the axis of rotation through an arc having an angle in a range of approximately 25° to 45° to move the pusher arms between fully retracted and fully extended positions. In preferred form, the motor rotates the driving member about the axis of rotation through an arc having an angle of approximately 25°.

In yet another form of the invention, an automated hatch for bulk transport vehicle includes a cover which is adapted to pivotally mount on the vehicle, with the cover moving between an open position and a closed position for extending over an annular flange of the vehicle and closing the fill opening defined by the annular flange. The automated hatch further includes a locking assembly with a driver assembly and a plurality of locking members. The driver assembly includes a plurality of pusher members each of which is pivotally coupled to a respective locking member. The locking members are mounted to a peripheral portion of the cover for engaging the annular flange of the vehicle for locking the cover in its closed position. The driver assembly further includes a driving member which rotates about a drive axis. Each of the pusher members are pivotally mounted to the driving member and are moved by the driving member between a retracted position and an extended position, with the pusher members pivoting the locking members to unlocked positions when the pusher members are moved to their retracted positions and pivoting the locking members to locked positions when the pusher members are moved to their extended positions thereby locking and closing the cover over the fill opening.

In one aspect, each of the pusher members comprise an articulating arm having a first portion coupled to the driving member and a second portion coupled to the respective locking member. Preferably, the first portion comprises a rod and the second portion comprises a clevis. In yet another form, each of the locking members comprises an inwardly facing C-shaped member, for engaging the annular flange of the vehicle. In addition, the cover includes a downwardly depending flange for extending around the upstanding annular flange of the container. In a further form, the cover includes a second downwardly extending flange for extending into the fill opening.

As will be understood from the foregoing, the automated hatch of the present invention provides numerous advantages over the prior known hatches. The present hatch eliminates the risks associated with the manual opening of the hatch cover. Furthermore, the hatch eliminates the iterative of steps presently required to unlock and lock conventional hatch covers. Instead, the automated hatch of the present invention permits an operator or a driver of the vehicle to remotely actuate unlocking, opening, closing, and locking of the cover. These and other objects, advantages, purposes, and features of the invention will become more apparent from the study of the following description taken in conjunction with the drawings.

DESCRIPTION OF THE DRAWINGS

FIG. 6 is a side elevation view illustrating the hatch cover in a fully open position.

DESCRIPTION OF THE PREFERRED EMBODIMENTS

Figure 1:
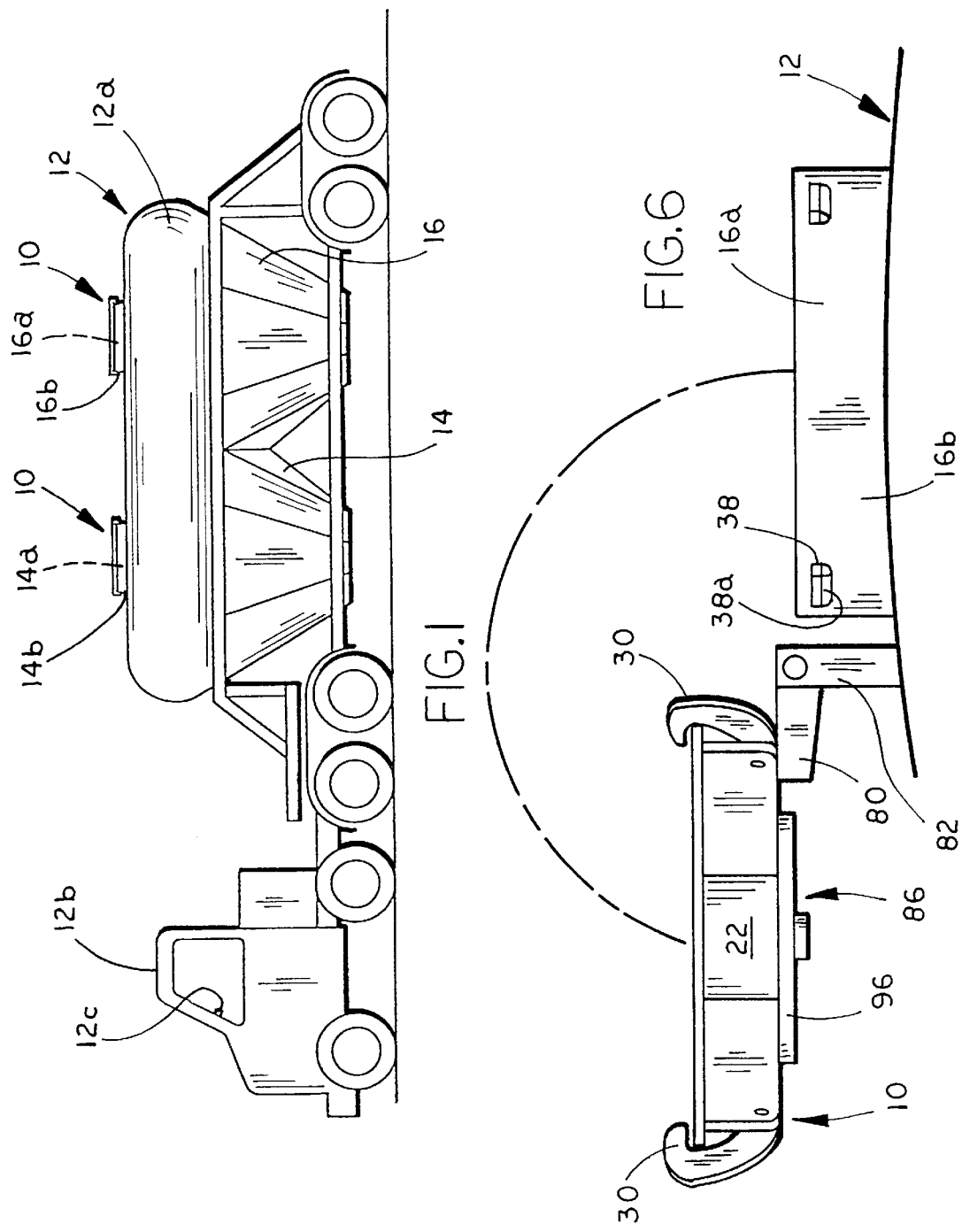
FIG. 1 illustrates a trailer truck with an automated hatch according to the present invention.

Referring to FIG. 1, the numeral 10 generally designates an automated hatch according to the present invention. Automated hatch 10 is especially suitable for use on a bulk transport vehicle 12. In the illustrated embodiment, vehicle 12 includes two containers 14 and 16, each with a respective fill opening 14a and 16a provided on a top portion of vehicle body 12a and defined through upstanding flanges 14b and 16b, respectively. Hatch covers 10 are pivotally mounted to the top surface of vehicle body 12a of each respective container and are positioned to extend over a respective upstanding flange 14b, 16b for covering and preferably sealing fill openings 14a and 16a of containers 14 and 16. Reference hereinafter will be made to the automated hatch 10 which is positioned over fill opening 16a of vehicle 12 for ease of description. It should be understood that automated hatch 10 may be used on a vehicle having a single opening or more than two openings, for example a tandem trailer or a train.

Figure 2:
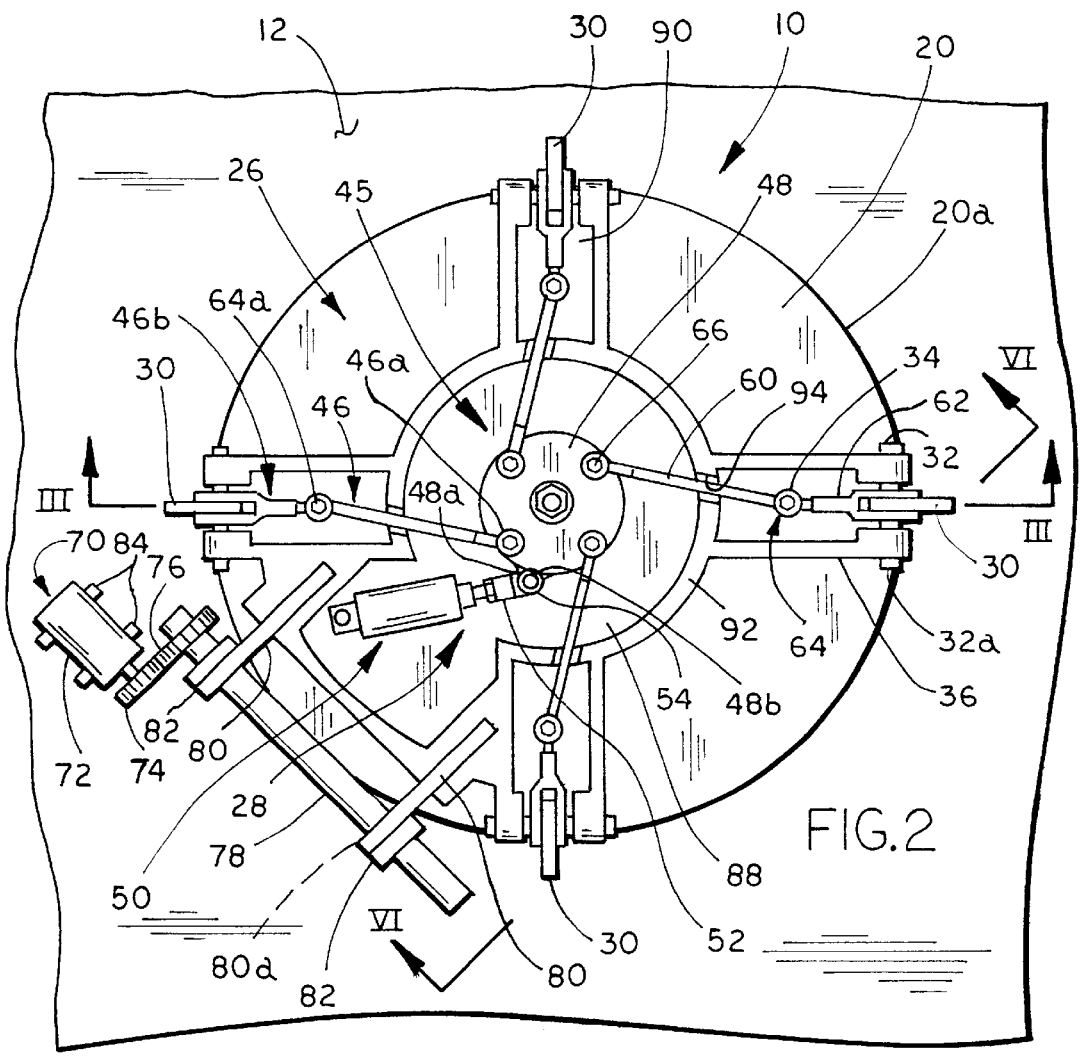
FIG. 2 is a plan view of the automated hatch of FIG. 1.
Figure 3:
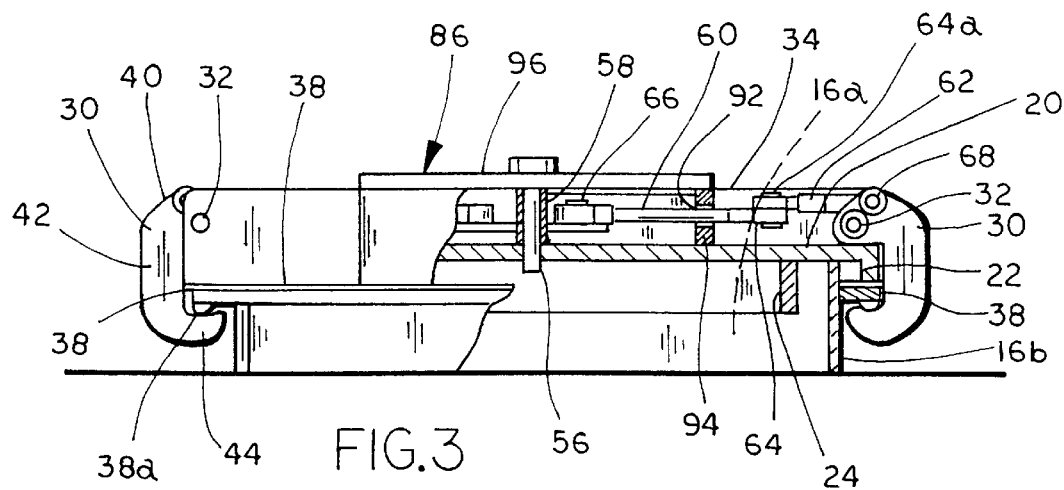
FIG. 3 is a partial fragmentary side elevation view of the hatch of FIG. 2 with the cover and locking assembly shown in a closed and locked position.

As best seen in FIG. 2, automated hatch 10 includes a circular cover 20 which extends over upstanding annular flange 16b, which projects upwardly from vehicle body 12a, and is pivotally mounted to vehicle body 12a for movement between an open position (FIG. 6) and a closed position for closing and preferably sealing fill opening 16a. Referring to FIG. 3, coyer 20 includes an outer downwardly depending annular flange 22, which is spaced radially outward from annular flange 16b, and a second downwardly depending flange 24 which is spaced radially inward of annular flange 22 and of annular flange 16b. When cover 20 is pivoted to its closed position, annular flanges 22 and 24 straddle flange 16b with flange 24 extending into opening 16a. In this manner, a seal or seals (not shown) may be positioned between flange 22 and flange 16b and/or between flange 24 and flange 16b to enhance the seal between cover 20 and flange 16b.

Mounted to cover 20 is a locking assembly 26, which permits remote locking and unlocking of cover 20, as will be more fully described below. Locking assembly 26 includes a driver assembly 28 and a plurality of locking members 30. Each locking member 30 is pivotally mounted to a peripheral portion of cover 20 on a pivot pin 32 for rotation about a pivot axis 32a. In preferred form, four locking members 30 are provided and are mounted to cover 20 at spaced radial intervals, for example at 0°, 90°, 180°, and 270° as viewed in FIG. 3. Pivot pin 32 extends between a pair of brackets 34 and 36, which are mounted to cover 20. Brackets 34 and 36 preferably comprise plate members which are rigidly mounted to cover 20, for example by fastening or welding. Alternately, brackets 34 and 36 may comprise plate members or projecting flange members which are formed with cover 20. Locking members 30 are pivoted about pins 32 by driver assembly 28 to move between unlocked positions (shown in FIG. 5) and locked positions (shown in FIG. 3). In order to secure cover 20 in its closed and sealed position against annular flange 16b, annular flange 16b is provided with an outwardly projecting lip or flange 38, which may comprise a continuous annular member, as illustrated in phantom in FIG. 3, or may comprise a plurality of lips or flanges located at each respective locking member 30 for engagement by locking members 30.

In the illustrated embodiment, each locking member 30 includes an upper portion 40, a downwardly depending portion 42, and an inwardly projecting portion 44 forming an inwardly facing, generally C-shaped plate member. Upper portion 40 projects inwardly from outer peripheral portion 20a of cover 20 and includes a transverse opening 40a through which pivot pin 32 extends to mount locking member 30 to brackets 34 and 36. Downwardly depending portion 42 extends generally parallel to flange 22 of cover 20 when locking member 30 is in its locked position. Inwardly projecting portion 44 extends below lip 38 to engage lower surface 38a of lip 38 when locking member 30 is rotated to its locked position to thereby lock and seal cover 20 over fill opening 16a.

In order to pivot locking members 30 from their unlocked positions to their locked positions, driver assembly 28 includes a driver 45 and a plurality of pusher members, for example pusher arms 46. Driver 45 includes a driving member 48 and a motor 50 which rotates driving member 48 as will be more fully described below. In preferred form, motor 50 is actuated remotely by a control 12c which is located either in the cabin (FIG. 1) or in another easily accessible location so that the operator or driver can remotely unlock or lock hatch 10 without having to scale the vehicle.

Motor 50 preferably comprises, for example, an electric servo motor which is preferably connected to and powered by the vehicle electrical system. Motor 50 includes an extensible driver rod 52 which is reciprocated between an extended position (shown in FIG. 4) and a retracted position (shown in FIG. 2). Rod 52 is pivotally coupled on its free end 54 by a pin 48b to an outwardly extending tab 48a provided on the periphery of driving member 48. In the illustrated embodiment, driving member 48 comprises a circular plate which is rotatably mounted to cover 20 on a shaft or pin 56 by a sleeve or bushing 58. Shaft 56 is rigidly mounted to cover 20 at the center of cover 20 and aligned along an axis 48c. In this manner, when rod 52 extends and contracts, rod 52 rotates driving member 48 about axis of rotation 48c.

Figure 4:
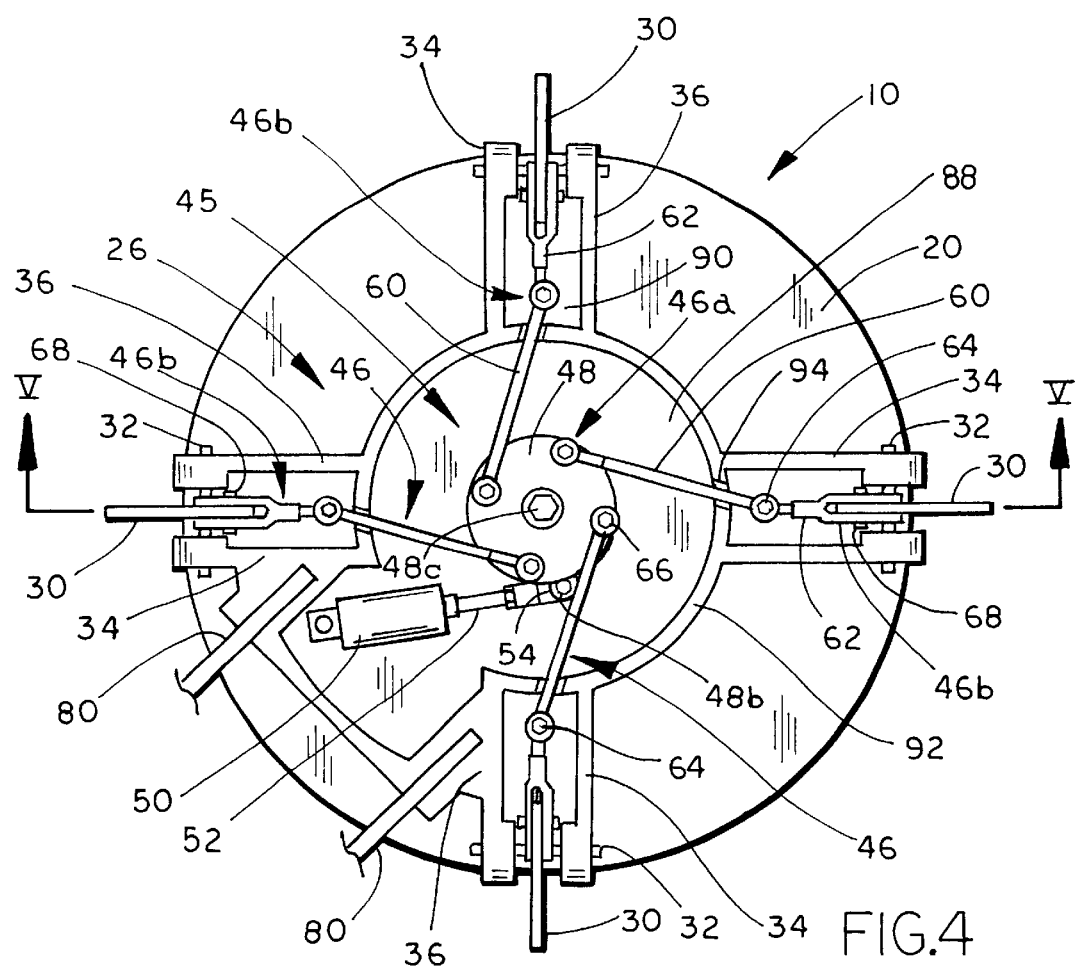
FIG. 4 is a plan view of the hatch of FIG. 1 with the cover in a closed position and the locking assembly in an unlocked position.

Pusher arms 46 are pivotally coupled at their respective first ends 46a to driving member 48 by pins 66 and coupled at their second ends 46b to locking members 30 by pins 68 which are offset from pin 32 so that when pusher arms 46 apply force to pins 68, locking members 30 pivot about pins 32 to move between their locked and unlocked positions. In preferred form, four pusher arms 46 are provided and are pivotally coupled to driving member 48 at its peripheral portion at radially spaced intervals approximately 90° apart. As best seen in FIG. 2, when locking members 30 are in their locked position, pins 66 are positioned along radii extending from the center of driving member 48 located at approximately 45°, 135°, 225°, and 315°. Referring to FIG. 4, when driving member 48 is rotated through its full range of rotation, and locking members 30 are pivoted to their respective unlocked positions, pins 66 are positioned along radii in a range of approximately 0°–20°, 90°–110°, 180°–200°, and 270°–290°. However, it should be understood that pins 66 may be coupled to driving member 48 along radii at different angles to achieve the same general movement of pusher arms 46.

Figure 5:
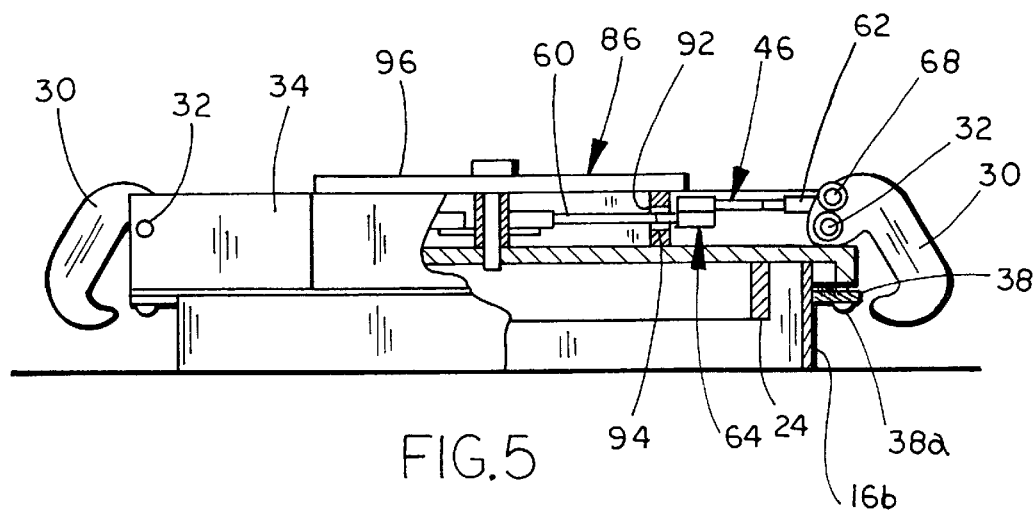
FIG. 5 is a partial fragmentary side elevation view of the hatch shown in FIG. 4.

In preferred form, each driver arm 46 comprises an articulating arm with a hinge joint 64 between its first and second ends 46a and 46b, with a first portion 60 of arm 46 coupled to driving member 48 by pin 66 and a second portion 62 pivotally coupled to a respective locking member 30 by pin 68. First portion 60 is pivotally coupled to second portion 62 at hinge joint 64 by a pin 64a which permits relative lateral movement between first portion 60 and second portion 62 in a common plane which is generally parallel to cover 20. First portion 60 preferably comprises rod or tubular member with eyes mounted on its respective ends for receiving pins 64a and 66. Second portion 62 preferably comprises a clevis with an eye for receiving pin 64a and with the spaced apart arms of the clevis receiving pin 68 therethrough for coupling the respective pusher arm to its respective locking member 30. Thus, when driving member 48 is rotated in a counter clockwise direction as viewed in FIG. 4, pusher arms 46 move in a generally horizontal plane inward and retract thus pivoting locking members 30 to their unlocked position as shown in FIG. 5. When driving member 48, however, is rotated in a clockwise direction as viewed in FIG. 2, pusher arms 46 pivot locking members 30 to their closed positions as seen in FIG. 3. In preferred form, driving member 48 rotates on shaft 56 through an arc in a range of 25° to 45° and, more preferably, through an arc of approximately 25°. In this manner, when motor 50 is energized, rod 52 rotates driving member 48 about axis 48c, which in turn moves or drives pusher arms 46 in their common plane which is generally horizontal and parallel to cover 20 to pivot locking members 30. Since arms 46 move in a plane generally parallel to cover 20, the height of locking assembly 26 is minimized. Furthermore, since locking members 30 are pivoted to engage a projecting lip, which provide engagement surfaces, on annular flange 16b rather than a receiving structure, locking assembly 26 is less susceptible to binding or malfunctioning than conventional locking assemblies.

Referring to FIGS. 4 and 5, once locking assembly 26 is unlocked, cover 20 may be then rotated to its open position as shown in FIG. 6 preferably by a second remotely operated driver assembly 70 as will be more fully described below. Driver assembly 70 preferably includes an electric motor 72 with a drive gear 74 which is connected to the vehicle electrical system and energized by a control, for example control 12c, preferably located in the cabin or in another accessible location so the driver or operator need not scale the vehicle to open cover 20. As previously noted, cover 20 is pivotally mounted to top surface of vehicle body 12a. As best seen in FIGS. 2 and 3, cover 20 includes a pair of mounting arms 80 which are rigidly mounted to cover 20, project outwardly therefrom, and include transverse openings 80a for receiving a shaft 78. Shaft 78 is rigidly coupled to arm 80 and is supported on vehicle body 12a by a pair of mounting brackets 82 (FIG. 6). Shaft 78 is journaled in mounting brackets 82, which are rigidly mounted to vehicle body 12a, for example, by fasteners or welds. Mounted to one end of shaft 78 is a reduction gear 76 which is driven by drive gear 74 of motor 72. Thus, when motor 72 is actuated, drive gear 74 which meshes with reduction gear 76 rotates shaft 78 to open or close cover 20. As noted, motors 50 and 72 may be actuated by a common remote control 12c or by individual remote controls which are preferably located in the vehicle cabin 12b or which may be located in other accessible location on the vehicle. Consequently, the driver of vehicle may operate both motors 50 and 72 to unlock hatch 10 and then open hatch 10 for filling the containers 14 and 16 and thereafter may close and lock hatch 10 without scaling the vehicle.

In preferred form, at least driver assembly 28 is enclosed by a housing 86 (FIG. 6). Housing 86 comprises a central compartment 88 which houses driving member 48, motor 50, and pusher arms 46. Compartment 88 is formed by an upstanding wall or plate member 92 which projects upwardly from cover 20. Pusher arms 46 extend through transverse passages 94 provided in wall 92 to permit pusher arms to extend from driving member 48 to locking members 30. Central compartment 88 preferably includes a cover 96 to protect motor 50 from debris and excessive moisture.

It can be appreciated from the foregoing description that automated hatch permits remote opening and closing and locking and unlocking of cover 20 and further provides a low profile locking assembly which reduces the aerodynamic drag of the locking device. While one form of the invention has been shown and described, other forms will now be apparent to those skilled in the art. For example, locking members 30 may have other configurations. In addition, vehicle 12 may include an alternate projecting member or members for engagement by locking members 30. Furthermore, locking assembly 26 may include other driver arrangements. For example, the driver may include an electric motor with a drive gear such as a worm gear, and a gear defining the driving member, with the drive gear meshing with the driving member to rotate the driving member. These and other driver arrangements may be used, as would be understood by those skilled in the art. Therefore, it will be understood that the embodiment shown in the drawings and described above is merely for illustrative purposes only and is not intended to limit the scope of the invention which is defined by the claims which follow and which are interpreted under the Doctrine of Equivalents.

I claim:

1. An automated hatch for a bulk transport vehicle having a container with at least one fill opening, the vehicle including an engagement surface adjacent the fill opening, said automated hatch comprising:
    a cover adapted for pivotally mounting to the vehicle over the fill opening for covering and sealing the fill opening; and
    a locking assembly supported on said cover, said locking assembly including at least one pivotal locking member, a pusher member, and a driver, said locking member being mounted to said cover for pivotal movement between an unlocked position and a locked position for engaging the engagement surface, said driver being remotely actuatable and moving said pusher member outwardly to pivot said locking member to said locked position and moving said pusher member inwardly to pivot said locking member to said unlocked position.

2. The automated hatch according to claim 1, wherein said driver includes a motor and a rotatable member, said pusher member pivotally coupled to said rotatable member, said motor rotating said rotatable member about an axis of rotation to move said pusher member either inwardly or outwardly to thereby pivot said locking member.

3. The automated hatch according to claim 2, wherein said pivotal movement of said locking member is movement about a pivot axis, and said pivot axis and said axis of rotation being substantially orthogonal.

4. The automated hatch according to claim 3, wherein said motor includes an extensible rod coupled to said rotatable member, said rod extending or retracting to rotate said rotatable member about said axis of rotation.

5. The automated hatch according to claim 3, wherein said pusher member moves in a plane generally orthogonal to said axis of rotation.

6. The automated hatch according to claim 3, wherein clockwise rotation of said rotatable member about said axis of rotation moves said pusher member outwardly thereby pivoting said locking member to said locked position and counter clockwise rotation of said rotatable member moves said pusher member inwardly thereby pivoting said locking member to said unlocked position.

7. The automated hatch according to claim 3, wherein said motor comprises a servo motor.

8. The automated hatch according to claim 7, wherein said servo motor includes a driver rod, said driver rod being pivotally coupled to said rotatable member.

9. The automated hatch according to claim 1, wherein said pusher member comprises an articulating pusher arm.

10. The automated hatch according to claim 9, wherein said articulating pusher arm includes a first portion pivotally coupled to said driver and a second portion pivotally coupled to said first portion on one end and pivotally coupled to said locking member on a second end.

11. The automated hatch according to claim 1, wherein said locking member comprises a C-shaped member, said C-shaped member being pivotally mounted to a peripheral portion of said cover for engaging the engagement surface of the vehicle when said locking member is pivoted to its locked position.

12. The automated hatch according to claim 1, wherein said locking assembly includes a plurality of said pusher members and a corresponding plurality of said locking members.

13. The automated hatch according to claim 1, further comprising a shaft and a motor, said cover mounted on said shaft, said shaft being adapted for mounting to the vehicle, and said motor driving said shaft to rotate said cover between an open position and a closed position.

14. The automated hatch according to claim 13, wherein said motor is actuated by a remote control.

15. An automated hatch for a bulk transport vehicle having a container with at least one fill opening, the vehicle including at least one engagement surface adjacent the fill opening, said automated hatch comprising:
    a cover adapted for mounting to the vehicle and for moving from an open position to a closed position for extending over the fill opening and for closing the fill opening;
    a driver;
    a plurality of pusher members and a corresponding plurality of locking members, said pusher members extending laterally outward from said driver in a common plane, each of said pusher members being coupled to a respective locking member, said locking members being mounted to said cover for pivotal movement between an unlocked position and a locked position wherein said locking members are adapted to engage the engagement surface, said driver moving said pusher members in an outward direction in said common plane to pivot said locking members to said locked positions and moving said pusher members inwardly to pivot said locking members to said unlocked positions.

16. The automated hatch according to claim 15, wherein said plane is generally parallel to an upper surface of said cover.

17. The automated hatch according to claim 15, wherein said locking members are pivotally mounted to a peripheral portion of said cover and are pivoted by said pusher members between said unlocked position and said locked position when said pusher members are moved outward from said driver.

18. The automated hatch according to claim 15, wherein said driver comprises a motor and a rotatable driving member, each of said pusher members being pivotally mounted to said driving member, said motor rotating said driving member about an axis of rotation, and said driving member moving said pusher members to extend outward or inward from said axis of rotation for pivoting said locking members between their locked and unlocked positions.

19. The automated hatch according to claim 18, wherein said motor rotates said driving member about said axis of rotation through an arc having an angle in a range of approximately 25° to 40° to move said pusher members between fully retracted and fully extended positions.

20. The automated hatch according to claim 19, wherein said motor rotates said driving member about said axis of rotation through an arc having an angle of approximately 25° when said driving member moves said pusher members between said fully retracted and fully extended positions.

21. The automated hatch according to claim 15, wherein each of said pusher members comprises an articulating pusher arm having a first portion pivotally coupled to said driver and a second portion pivotally coupled to said locking member.

22. The automated hatch according to claim 15, wherein each of said locking members comprise inwardly facing C-shaped members for engaging the engagement surface to thereby lock said cover over the fill opening.

23. An automated hatch for a bulk transport vehicle, the vehicle including a container and at least one upstanding annular flange defining a fill opening for the container, the automated hatch comprising:

a cover adapted to pivotal mount on the vehicle, said cover moving between an open position and a closed position for extending over the annular flange and closing the fill opening, and a locking assembly including a driver assembly and a plurality of locking members, said driver assembly including a plurality of pusher members, each of said pusher members being pivotally coupled to a respective locking member, said locking members being mounted to a peripheral portion of said cover for engaging the annular flange of the vehicle for locking said cover in said closed position, said driver assembly further including a driving member, said driving member rotating about a drive axis, each of said pusher members being pivotally mounted to said driving member and being moved by said driving member between a retracted position and an extended position, said pusher members pivoting said locking members to unlocked positions when said pusher members are moved to their retracted positions and pivoting said locking members to locked positions when said pusher members are moved to their extended positions thereby locking said cover in said closed position over the fill opening.

24. The automated hatch according to claim 23, wherein said driving member comprises a plate member, said plate member being rotatably mounted to said cover on a shaft, said driver assembly further comprising a motor, and said motor coupled to said plate member and rotating said plate member on said shaft to actuate said locking assembly.

25. The automated hatch according to claim 23, wherein said motor is energized and de-energized by a remote control, said remote control being provided in a location in a cab of the vehicle thus easily accessible by one of an operator and a driver of the vehicle.

26. The automated hatch according to claim 23, wherein said pusher members are pivotally coupled to said driving member at spaced locations around a peripheral portion of said driving member.

27. The automated hatch according to claim 23, wherein said driver assembly further includes a motor, said motor rotating said driving member about said drive axis through an arc in a range of 25° to 45°.

28. The automated hatch according to claim 27, wherein said motor rotates said driving member about said axis of rotation through an arc having an angle of approximately 25° to move said pusher members between fully retracted positions and fully extended positions.

29. The automated hatch according to claim 23, wherein said pusher members extend and retract in plane generally perpendicular to said drive axis.

30. The automated hatch according to claim 23, wherein each of said pusher members comprise an articulating arm having a first position coupled to said driving member and a second portion coupled to said respective locking member.

31. The automated hatch according to claim 30, wherein said first portion comprises a rod, and said second portion comprising a clevis, said rod and said clevis being pivotally coupled and being laterally movable with respect to each other.

32. The automated hatch according to claim 30, wherein each of said locking members comprises an inwardly facing C-shaped member for engaging the annular flange of the vehicle.

33. The automated hatch according to claim 23, wherein said cover includes a downwardly depending flange for extending around the upstanding annular flange of the container.

34. The automated hatch according to claim 33, wherein said cover includes a second downwardly extending flange for extending into the fill opening.

* * * * *